Patented May 8, 1951

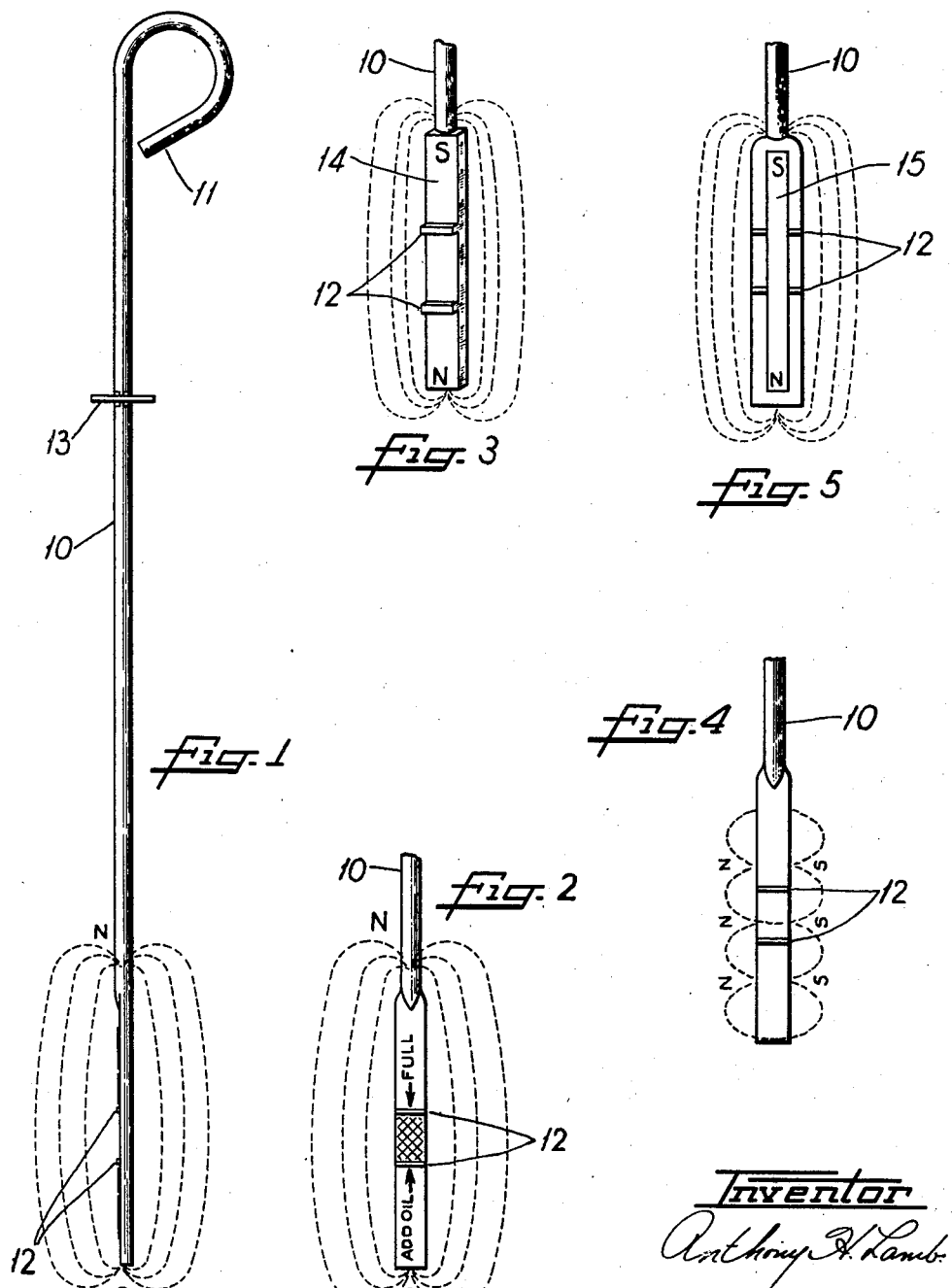

2,552,330

UNITED STATES PATENT OFFICE 2,552,330

OIL LEVEL GAUGE

Anthony H. Lamb, Hillside, N. J.

Application December 13, 1946, Serial No. 716,002

1 Claim. (Cl. 33—126.7)

This invention relates to a gauge adapted for insertion into a reservoir to measure the level of the lubricating oil contained therein and more particularly to a novel gauge that includes a permanent magnet for removing iron, steel, nickel and other magnetic particles and dust from the oil.

My invention is particularly well adapted for use in connection with automobile and other internal combustion engines. Engine wear generates iron and steel dust, powder and occasionally sizable particles all of which mix the lubricating oil in the crankcase. Similar dust floating in the atmosphere is also introduced into the oil through the customary fill pipe, air intakes, and breather openings. This dust, etc. mixes into and circulates with the lubricating oil and acts as an abrasive to accelerate engine wear and, in fact, often causes the premature failure of a vital part.

The problem of removing steel dust and similar foreign matter from lubricating oil under normal use has been the subject of much attention on the part of engine manufacturers, oil suppliers and others skilled in the art. Mechanical oil filters do not solve the problem for two reasons, namely, (1) fine particles in the form of non-filterable powder pass through the filter, and (2) many vital engine parts operate directly in the oil carried in, or scooped up from, the crankcase.

I am aware of various magnetic devices adapted to be threaded into the crankcase and which are intended to attract and retain steel particles by magnetic attraction. Such devices are open to the following objections:

1. When the device is threaded into the drain opening of the crankcase the permanent magnet is positioned near the bottom of the oil level which is usually the sludge region. Thick sludge covering the magnet prevents the foreign particles from reaching the effective area of the magnet. It is apparent that unless the particles contact the magnet they are washed away to continue their journey in the oil stream.

2. Since these devices are threaded into the crankcase there is a practical limit to the size of magnet that can be employed. Consequently, such devices have a very limited, effective area.

3. A permanent magnet positioned at the bottom of the oil level cannot always attract the fine, dust-like particles that float in the oil and circulate at the higher level.

4. A tool is required to remove the device from the engine for the purpose of removing therefrom whatever particles may have accumulated on the magnet.

5. Since the device is threaded into the bottom of the crankcase its removal requires the quick use of some means to prevent the escape of oil. Thus, as a practical matter, the device is cleaned only when the oil is to be changed.

6. A device positioned at the bottom of the oil level is ineffective for the removal of particles from the oil as the latter splashes about in the crankcase when the engine is operating.

Thus, it is apparent that although magnetic, plug-type devices serve a useful purpose to some degree, they are not effective for the removal of fine, light dust that acts as an abrasive when injected between two relatively movable parts. Also, because of the inconvenience attending their removal, the devices are not cleaned except at long intervals. This permits the collected layer of particles to act as a magnetic shield thereby reducing the effectiveness of the device as a whole.

A device made in accordance with my invention overcomes the above stated objections. It has an extended range of effectiveness throughout the entire depth of the oil, does not require the use of tools for either installation or removal, and may be removed for frequent cleaning with the utmost of convenience.

An object of this invention is the provision of a combination oil level gauge and magnetic particle remover.

An object of this invention is the provision of an oil level gauge provided with a permanent magnet field whereby steel particles floating in the oil will adhere to the gauge for easy, periodic removal.

An object of this invention is the provision of an oil level gauge and magnetic particle remover adapted for insertion into the oil reservoir of an engine without the use of tools, whereby the device may readily be removed from the reservoir for the purpose of determining the level of the oil and/or removing metallic particles adhering thereto.

An object of this invention is the provision of a magnetic oil level gauge comprising a rod, a handle section at the outer end of the rod, and a permanent magnet secured to the inner end of the rod.

An object of this invention is the provision of a magnetic oil level gauge comprising a rod terminating in a handle section, markings relating to factors of measurement carried by the other end of the rod, said rod being permanently magnetized.

These and other objects and advantages will be apparent from the following description when taken in connection with the accompanying drawing.

While I shall describe the invention in connection with its use as associated with a crankcase of an internal combustion engine its practical application is much more extensive. It may, for example, be used to remove iron or steel particles from fluid contained within gear boxes, transmissions, differentials, feed line traps, etc.

In the drawing wherein like numerals refer to like parts in the several views:

Figure 1 is a side view of an oil level gauge showing the magnetic lines of force which are present when the gauge is magnetized axially;

Figure 2 is a fragmentary, side view of the gauge and showing some of the markings thereon;

Figure 3 shows an oil level gauge in which a separate, permanent magnet is secured to the end of the rod;

Figure 4 shows a gauge similar to the Figures 1 and 2 construction but which is magnetized transversely; and Figure 5 illustrates a permanent magnet affixed to a rod made of non-magnetic metal, plastic or other material.

Referring now to Figures 1 and 2, the oil level gauge comprises a rod 10 made of a ferrous alloy (preferably an alloy possessing the properties of a good, permanent magnet), terminating in a handle section 11 on one end. The other end of the rod is flattened somewhat to provide a base for the markings 12 that are related to factors of measurement, substantially as shown. Intermediate of the ends of the rod there is disposed a washer 13 that serves as a stop when the gauge is inserted into an engine crankcase through the provided opening, as is well known.

By placing the rod in a strong magnetic field or by stroking axially with a bar magnet, the rod is permanently magnetized and magnetic lines of flux emanate therefrom as shown by the dotted lines. The magnetic strength of the permanent magnet thus formed depends upon the alloy of which the rod is made but I have found that regular, steel oil gauges as sold on the market may be magnetized permanently to a degree satisfactory for the intended purpose.

In practice, the oil level gauge is normally disposed within the opening provided for this purpose in the engine crankcase and is removed by the owner or service station attendant to check the level of the oil. It should be noted that the effective length of the permanent magnet extends beyond the markings 12. Thus, when the gauge is in place any iron or steel particles, chips, dust, etc. floating at any level or depth in the oil during operation of the engine or motion of the automobile will be attracted to and adhere to the rod when once the particle comes into the magnetic flux field. The particles collected upon the magnetic rod will be removed by the service station attendant as a matter of course each time he checks the oil level. Also, by reason of the simple operation involved, the owner of the automobile can readily remove the gauge to wipe off accumulated metal particles as often as may be required or desired.

As the alloys capable of being made into the strongest permanent magnets are somewhat expensive the permanent magnet may be restricted to the useful area and the remainder of the gauge made of any economical metal. Such a construction is shown in Figure 3 wherein a conventional bar magnet 14 is affixed to the end of the rod 10 by welding or other suitable means. The markings for measurement purposes may be inscribed directly upon the magnet or molded as an integral part thereof, as shown.

Figure 5 illustrates a narrow, permanent magnet 15 cemented or welded directly to the flattened section of the rod. In this case the rod is made of a non-magnetic material to prevent short-circuiting of the magnet.

Figure 4 illustrates a gauge in which the rod is magnetized transversely as distinguished from the axially magnetized rod shown in Figures 1 and 2.

Having described my invention it is now apparent that I provide a simple device for the removal of steel particles from engine lubricating oil. While the invention is extremely simple it serves a most necessary and useful purpose and constitutes a long step forward in the practical solution of a problem the existence of which has been known for many years. Those who are skilled in the art will be aware of variations which can be made in the assembly and arrangement of the parts without departing from the spirit and scope of the invention as set forth in the claim.

I claim:

An oil level gauge comprising a rod terminating in a handle section at one end and a flattened section at the other end, markings relating to factors of measurement carried by the said flattened section, said flattened section being transversely magnetized such that the diametrically-opposed longitudinal edges of the flattened end section constitute the polar surfaces of a magnet.

ANTHONY H. LAMB.

REFERENCES CITED

The following references are of record in the file of this patent:

UNITED STATES PATENTS

| Number | Name | Date |
|---|---|---|
| 590,501 | Staecker | Sept. 21, 1897 |
| 2,032,800 | Haltenberger | Mar. 3, 1936 |

FOREIGN PATENTS

| Number | Country | Date |
|---|---|---|
| 695,665 | Germany | Aug. 30, 1940 |